United States Patent
Mack et al.

(10) Patent No.: US 9,475,712 B2
(45) Date of Patent: Oct. 25, 2016

(54) PROCESS FOR RECOVERING SULFATE AND CHLORIDE SALTS FROM WASTEWATER, MIXED SALTS, AND BRINES

(71) Applicant: VEOLIA WATER TECHNOLOGIES, INC., Moon Township, PA (US)

(72) Inventors: Benjamin S. Mack, Chicago, IL (US); Timothy J. Rittof, West Chicago, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 0 days.

(21) Appl. No.: 15/079,174

(22) Filed: Mar. 24, 2016

(65) Prior Publication Data

US 2016/0280571 A1    Sep. 29, 2016

Related U.S. Application Data

(60) Provisional application No. 62/137,916, filed on Mar. 25, 2015.

(51) Int. Cl.

| | |
|---|---|
| C01D 7/24 | (2006.01) |
| C02F 1/52 | (2006.01) |
| C01D 5/16 | (2006.01) |
| C01D 3/16 | (2006.01) |
| C01D 3/20 | (2006.01) |
| C02F 1/44 | (2006.01) |
| C02F 1/04 | (2006.01) |
| C02F 101/12 | (2006.01) |
| C02F 101/10 | (2006.01) |
| C02F 103/10 | (2006.01) |

(52) U.S. Cl.
CPC . *C02F 1/52* (2013.01); *C01D 3/16* (2013.01); *C01D 3/20* (2013.01); *C01D 5/16* (2013.01); *C02F 1/04* (2013.01); *C02F 1/441* (2013.01); *C02F 2001/5218* (2013.01); *C02F 2101/101* (2013.01); *C02F 2101/12* (2013.01); *C02F 2103/10* (2013.01)

(58) Field of Classification Search
CPC ............. C01D 7/24; C01D 7/40; C01D 1/30
USPC ....................................................... 23/302 R
See application file for complete search history.

(56) References Cited

U.S. PATENT DOCUMENTS 8,158,097 B2 *  4/2012  DiTommaso ........... C02F 1/048
                                                 210/702

FOREIGN PATENT DOCUMENTS

| CN | 104386870 A | 3/2015 |
|---|---|---|
| RU | 2086511 C1 | 8/1997 |
| UA | 72356 C2 | 2/2005 |

OTHER PUBLICATIONS

International Search Report mailed Jun. 8, 2016 in re International Application No. PCT/US2016/024131 filed Mar. 25, 2016.

* cited by examiner

*Primary Examiner* — Edward Johnson
(74) *Attorney, Agent, or Firm* — Coats and Bennett PLLC (57) ABSTRACT

A process is described for recovering alkali-chloride and alkali-sulfate salts from a salt solution. The salt solution comprises alkali metal, chloride and sulfate ions and is directed to a hydrous salt crystallization unit which crystallizes hydrated sulfate salts that comprise sulfate and at least one alkali metal. A purged solution from the hydrous salt crystallization unit is directed to a chloride salt crystallization unit while the hydrated sulfate salt crystals are melted to form an aqueous sulfate solution which is directed to a sulfate crystallization unit. Anhydrous sulfate salts are crystallized from the aqueous sulfate solution to form sulfate salt crystals comprising sulfate and at least one alkali metal. In the chloride salt crystallization unit, chloride salt is crystallized to form chloride salt crystals. A purge from the chloride salt crystallization unit is directed to the hydrous salt crystallization unit.

24 Claims, 4 Drawing Sheets

PROCESS FOR RECOVERING SULFATE AND CHLORIDE SALTS FROM WASTEWATER, MIXED SALTS, AND BRINES

This application claims priority under 35 U.S.C. §119(e) from the following U.S. provisional application: Application Ser. No. 62/137,916 filed on Mar. 25, 2015. That application is incorporated in its entirety by reference herein.

FIELD OF THE INVENTION

The present invention relates to processes wherein sulfate and chloride salts are recovered from the wastewater, mixed salts, and brines.

BACKGROUND OF THE INVENTION

Many wastewater steams include substantial amounts of mixed salts. Various countries passed and continue to pass various regulations that propagate strict standards for wastewater disposal. Streams with substantial contaminants, therefore, cannot be traditionally disposed in these countries. There is a need for a cost effective treatment to remove contaminants from these wastewater streams, such as through salt production.

One example of a wastewater stream that contains substantial contaminants and cannot be traditionally disposed in some areas of the world is the wastewater stream produced in coal to liquid or coal to chemical processes. Coal to liquid processes allow coal to be processed into useful materials such as liquid fuel. These processes are especially useful in regions that have an abundance of coal but do not have enough oil to meet demands. Although coal to liquid processes are overall attractive, they yield wastewater effluents that are often problematic to process. Treatment of these wastewater streams through typical treatment methods results in production of a mixed salt comprised of sodium sulfate and sodium chloride along with various other contaminants. Under various regulatory requirements in various countries, these mixed salts cannot be disposed of in a landfill.

SUMMARY OF THE INVENTION

This application is directed towards methods of recovering sulfate and chloride salts. Some embodiments are directed to methods for treating wastewater from a coal to chemical or coal to liquid process. Coal is converted to a chemical or liquid, and a wastewater is produced. The wastewater is concentrated to form a salt solution. The salt solution contains alkali metal, chloride, and sulfate ions. The salt solution is directed to a hydrous salt crystallization unit, where hydrated sulfate salts are crystallized and a hydrous salt crystallization unit solution is produced. The hydrated sulfate salt crystals are melted to form an aqueous sulfate solution. The aqueous sulfate solution is directed to a sulfate crystallization unit, where anhydrous sulfate salts are crystallized. The anhydrous sulfate salt crystals comprise sulfate and at least one alkali metal. The sulfate crystallization unit further produces a sulfate crystallization unit solution. At least a portion of the sulfate crystallization unit solution is directed to the hydrous salt crystallization unit. Additionally, at least a portion of the hydrous salt crystallization unit solution or at least a portion of the sulfate crystallization unit solution are directed to a chloride salt crystallization unit. Chloride salt crystals comprising chloride and at least one alkali metal are crystallized in the chloride salt crystals. The chloride salt crystallization unit further produces a chloride salt crystallization unit solution, which is then directed, at least in part, to the hydrous salt crystallization unit.

Other embodiments are directed towards treating wastewater from a coal to chemical or coal to liquid process by converting coal to chemical or liquid and producing a wastewater. The wastewater is pretreated to remove at least some contaminants, and then pre-concentrated to form a concentrated wastewater. Organics are removed from the concentrated wastewater. The concentrated wastewater is further concentrated to form a salt solution. The salt solution comprises alkali metal, chloride, and sulfate ions. The salt solution is directed to a hydrous salt crystallization unit, where hydrated sulfate salts crystals comprising sulfate and at least one alkali metal are formed. The hydrous salt crystallization unit further produces a hydrous salt crystallization unit solution. The hydrated sulfate salt crystals are melted to form an aqueous sulfate solution, which is then directed to a sulfate crystallization unit. Anhydrous sulfate salts comprising sulfate and at least one alkali metal are crystallized. A sulfate crystallization unit solution is also produced and directed to the hydrous salt crystallization unit. At least a portion of the hydrous salt crystallization unit solution and/or at least a portion of the sulfate crystallization unit solution is directed to a chloride salt crystallization unit. Chloride salt crystals comprising chloride and at least one alkali metal are formed therein, along with a chloride salt crystallization unit solution. At least a portion of the chloride salt crystallization unit solution is directed to the hydrous salt crystallization unit.

Yet another embodiment is directed to recovering alkali-chloride and alkali-sulfate salts from a salt solution. In these embodiments, a salt solution comprising alkali metal, chloride, and sulfate ions is directed to a hydrous salt crystallization unit. The hydrous salt crystallization unit crystallizes hydrated sulfate salts that comprise sulfate and at least one alkali metal. The purge solution from the hydrous salt crystallization unit is directed to a chloride salt crystallization unit, while the hydrated sulfate salt crystals are melted to form an aqueous sulfate solution. The aqueous sulfate solution is directed to a sulfate crystallization unit. Anhydrous sulfate salts are crystallized from the aqueous sulfate solution to form sulfate salt crystals comprising sulfate and at least one alkali metal. The purge solution from the sulfate crystallization unit is directed in part to the hydrous salt crystallization unit and in part to the chloride salt crystallization unit. In the chloride salt crystallization unit, chloride salt is crystallized to form chloride salt crystals comprising chloride and at least one alkali metal. The purge from the chloride salt crystallization unit solution is directed at least in part to the hydrous salt crystallization unit.

The methods herein further relate to methods for recovering sodium sulfate and sodium chloride. In one embodiment of these methods, a solution comprising sodium, chloride, and sulfate is directed to a Glauber's salt crystallizer. Crystals of $Na_2SO_4 \cdot 10H_2O$ crystals are formed, along with a Glauber's salt crystallizer solution. The $Na_2SO_4 \cdot 10H_2O$ crystals are melted to form an aqueous sodium sulfate solution. The aqueous sodium sulfate solution is directed to a $Na_2SO_4$ crystallizer. Sodium sulfate is crystallized from the aqueous sodium sulfate solution to form $Na_2SO_4$ crystals and a $Na_2SO_4$ crystallizer solution. At least a portion of the $Na_2SO_4$ crystallizer solution is recycled to the Glauber's salt crystallizer. At least a portion of the Glauber's salt crystallizer solution or at least a portion of the $Na_2SO_4$ crystallizer solution is recycled to a NaCl crystallizer. In the NaCl crystallizer, NaCl is crystallized from the Glauber's salt crystallizer solution or the $Na_2SO_4$ crystallizer solution to form NaCl crystals and a NaCl crystallizer solution. At least a portion of the NaCl crystallizer solution is recycled to the Glauber's salt crystallizer.

DESCRIPTION OF AN EXEMPLARY EMBODIMENT

The present invention entails a process to recover saleable salts. The process of the present invention aims to selectively remove salts such as sulfate salts and chloride salts. The process may be used, for example, in treating wastewater to remove sulfate and chloride salts from wastewater effluents in order that resulting waste can be disposed of in a cost effective way. Not only are the salts removed, but the process described herein aims to convert these removed salts into salable salts. The processes disclosed herein may be used to treat a brine, such as one obtained from a zero liquid discharge process. The process used herein may also be used to selectively recover salable chloride and sulfate salts from brines prepared from mixed salts.

Figure 1:
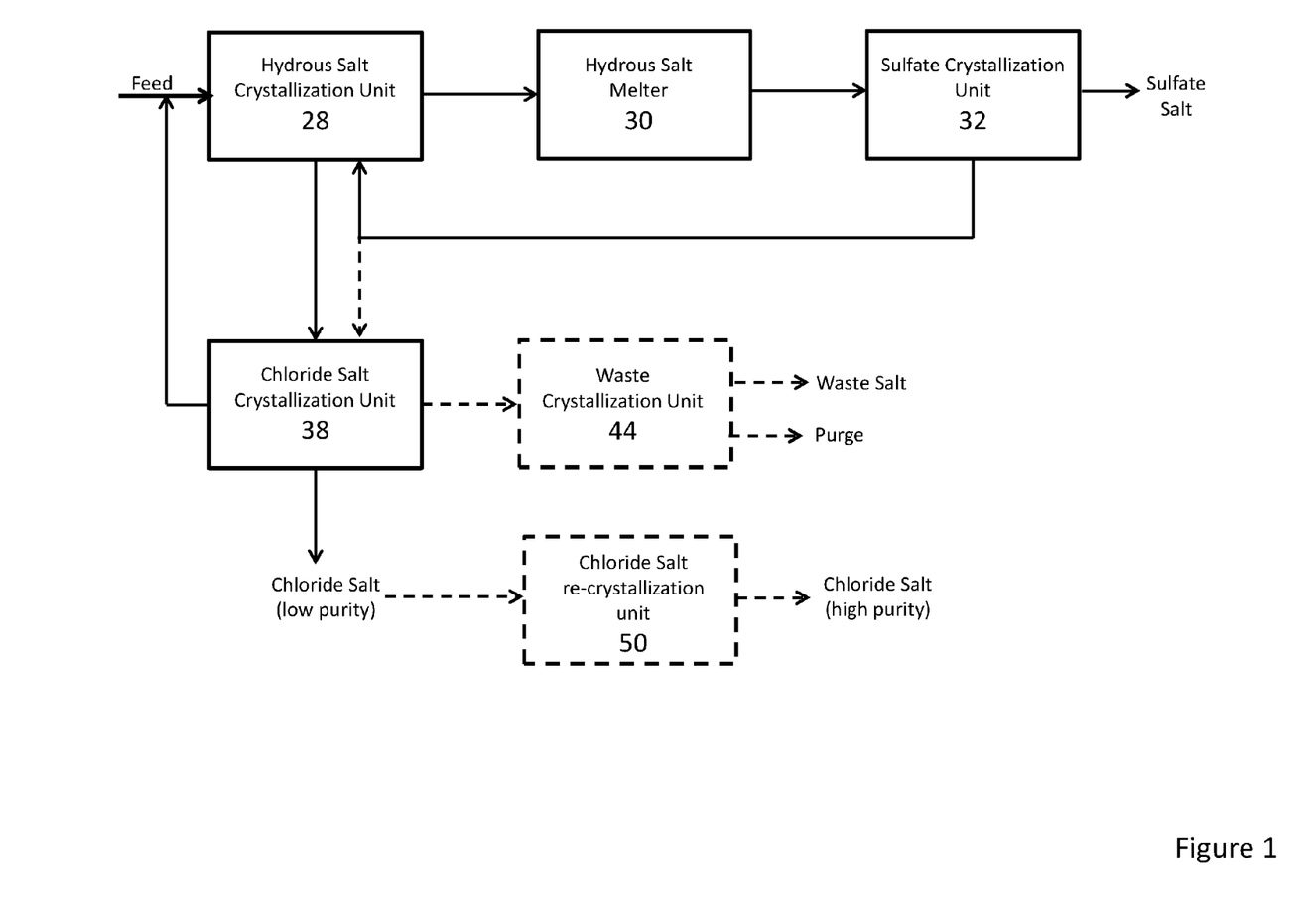
FIG. 1 is a schematic diagram showing an exemplary method for recovering sulfate and chloride salts.

One exemplary embodiment of such a process is shown in FIG. 1. A feed containing chloride, sulfate, and alkali metal ions is directed to a hydrous salt crystallization unit 28. The feed is subjected to a hydrous salt crystallization process to form hydrous forms of sulfate salts. In a preferred embodiment, sodium is present in the feed and the hydrous salt crystallization unit 28 is a Glauber's salt crystallization unit. The Glauber's salt crystallization process produces sodium sulfate decahydrate ($Na_2SO_4.10H_2O$). In another preferred embodiment, the alkali metal ions include lithium ions. In some embodiments, the crystallization process encourages crystal growth by subjecting the feed to low temperatures. Exemplary temperatures that are appropriate for some embodiments are temperatures between −5° C. and 15° C.

The hydrous sulfate salt produced from hydrous salt crystallization unit 28 is separated from the mother liquor and the salt is directed to a hydrous salt melter 30. The remaining mother liquor from the hydrous sulfate salt crystallization unit 28 is directed to a chloride salt crystallization unit 38. The hydrous sulfate salt is heated in the melter 30. Heating the hydrous sulfate salt releases the waters of hydration from the crystals, which then dissolves the crystals. Heat to the melter 30 may be provided by steam or through other heat recovery means in the system. In some embodiments the hydrous sulfate salt may be Glauber's salt; in such embodiments, the Glauber's salt is heated to temperatures at or above 32° C.

The melted hydrous sulfate salt is directed to a sulfate salt crystallization unit 32. Sulfate salts in anhydrous form are crystallized at high temperatures. For example, if the alkali metal includes sodium, the sulfate salt crystallization unit 32 crystallizes $Na_2SO_4$ at high temperatures. Because many different forms of evaporators or other crystallization units may be used with the methods disclosed herein, one of skill in the art appreciates that such temperatures will vary due to the crystallization unit elected. Any temperature high enough to allow formation of the anhydrous salt of interest rather than the hydrous version of that salt would be acceptable. The sulfate salt crystallization unit 32 produces a condensate and a salable quality anhydrous sulfate salt. The condensate may be released, directed to another portion of the plant for reuse, or may be further treated such as, for example, via condensate polishing processes.

Purge from the sulfate salt crystallization process is preferably recycled to, at least, the hydrous salt crystallization unit 28. In other embodiments, the purge from the sulfate salt crystallization process may be directed to the chloride salt crystallization unit 38, or to a combination of the hydrous salt crystallization unit 28 and the chloride salt crystallization unit 38.

Mother liquor purged from the hydrous salt crystallization unit 28 is treated in the chloride salt crystallization unit 38 to form chloride salt crystals. For example, if the alkali metal utilized in an embodiment is sodium, chloride salt crystallization unit 38 would form sodium chloride crystals. In some embodiments, the purge from the sulfate salt crystallization unit 32 is also included in chloride salt crystallization unit 38. In some embodiments, the chloride salt crystallization unit 38 may operate with just the mother liquor from the hydrous salt crystallization unit 28, just the purge from the sulfate salt crystallization unit 32, or combinations of both streams. The chloride salt crystallization process forms chloride salt crystals, which are removed from the crystallizer. In some embodiments, a condensate is produced, which is also removed.

The chloride salt crystals removed from the chloride salt crystallizer 38 are often relatively low purity. These are salable for some industrial processes. Other industries, however, may desire higher purity salts. In some embodiments, high purity chloride salts may be produced by incorporating a recrystallization process. In such a process, the chloride salt crystals from the chloride salt crystallization unit are directed to a recrystallization unit 50. The recrystallization unit 50 recrystallizes the chloride salt to produce a higher quality chloride salt crystal. For example, the recrystallization unit 50 may melt the chloride salt crystals and then induce crystallization thereof.

The remaining purge in the chloride salt crystallizer 38 may be directed back to the hydrous salt crystallization unit 28 for additional salt recovery, directed to a back-end crystallizer 44 to purge contaminants that may have cycled up in the system, or directed to a combination thereof. The condensate from the chloride salt crystallization unit 38 may be released, directed to other utilities in the plant, or further treated such as by condensate polishing.

The back end crystallizer 44 may receive purge from the chloride salt crystallization unit 38 and further treats the purge to further reduce the volume of purge that must be discarded, thus minimizing disposal costs. Waste salt is crystallized and removed from the back end crystallizer 44, reducing the amount of purge to be disposed. The waste salt and remaining purge may then be properly disposed according to the relevant disposal regulatory scheme.

Figure 2:
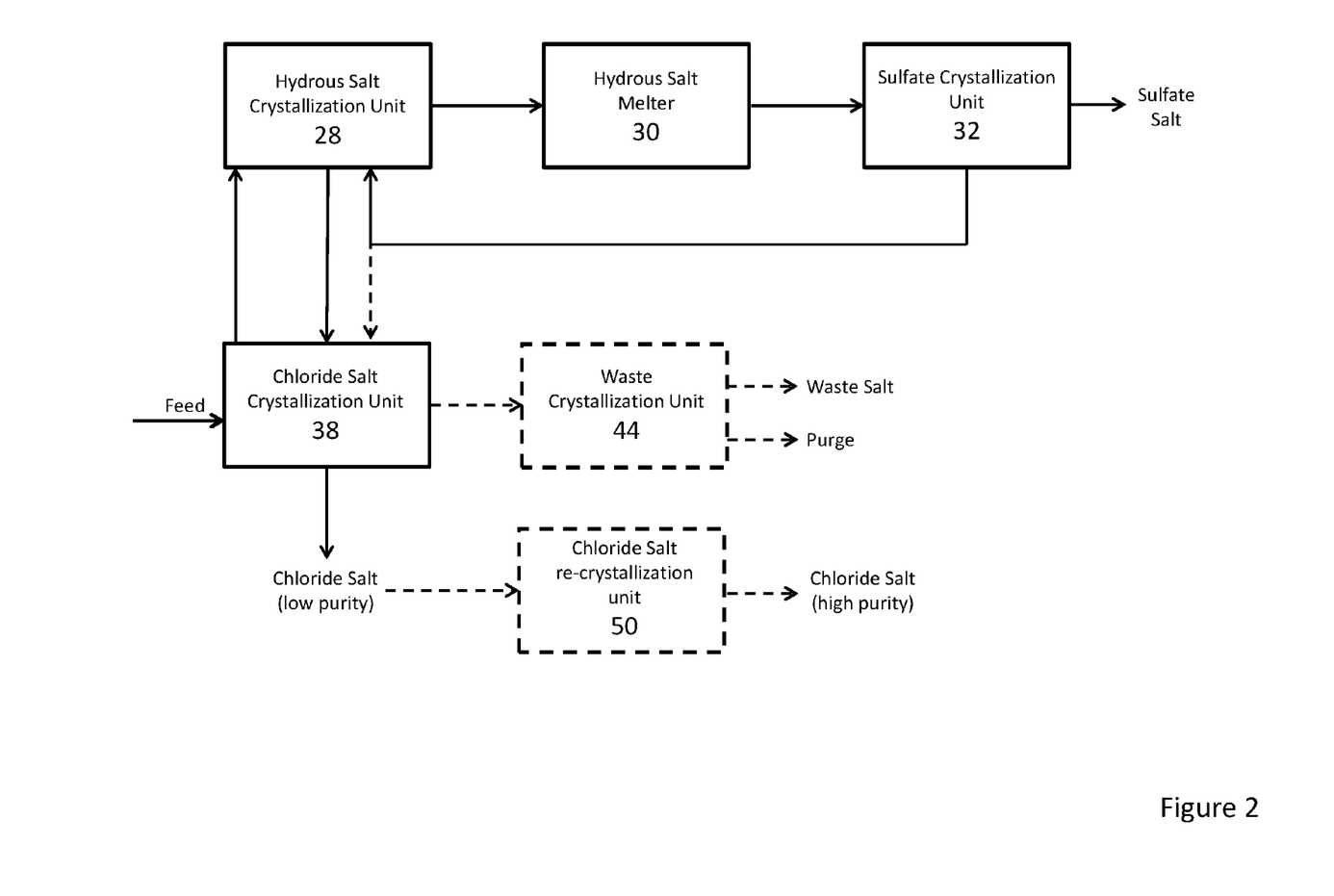
FIG. 2 is another schematic diagram showing an exemplary method for recovering sulfate and chloride salts.

A related embodiment is shown in FIG. 2. The FIG. 2 embodiment includes the same general process steps as the embodiment in FIG. 1. FIG. 2 differs from FIG. 1 in the order the steps are performed. In FIG. 2, the feed containing alkali metal ions, chloride, and sulfate enters the chloride salt crystallization unit 38. Chloride salt crystals are formed.

In some embodiments, the chloride salt crystals may be further purified, such as by recrystallization in recrystallization unit 50.

The mother liquor from the chloride salt crystallizer 38 is purged to the hydrous salt crystallization unit 28. Hydrated sulfate salt crystals are formed in hydrous salt crystallization unit 28. The crystals are sent to melter 30, while the mother liquor from the hydrous salt crystallization unit 28 is purged back to the chloride salt crystallization unit 38.

In the melter 30, the hydrated salt crystals are melted to release the waters of hydration. The melted solution is then directed to the sulfate salt crystallizer 32. Sulfate salt crystallizer 32 crystallizes anhydrous sulfate salts. The mother liquor from the sulfate slat crystallizer 32 may be recycled back to the hydrous salt crystallizer 28, the chloride salt crystallizer 38, or combinations thereof.

As one of skill in the art appreciates, the FIG. 1 embodiment is preferable for feeds where the ratio of the chloride to sulfate concentration is greater than 12. The FIG. 2 embodiment is preferable for feeds where the chloride to sulfate concentration is less than 5. Either embodiment may be preferable for feeds where the ratio of chloride to sulfate concentration is between 5 and 12. Nonetheless, both embodiments may be used with any stream that includes chloride, sulfate, and alkali metal ions.

Figure 3:
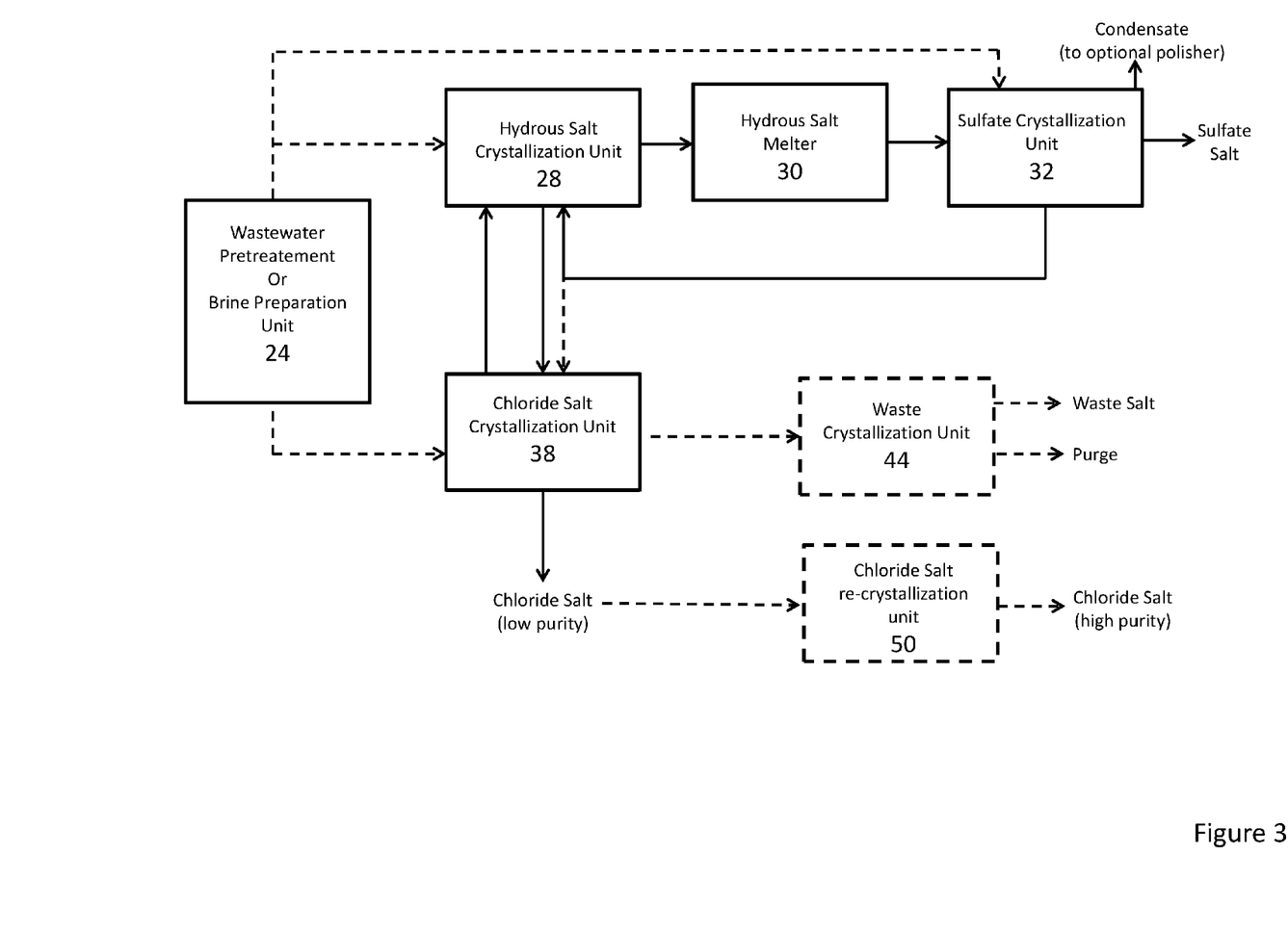
FIG. 3 is still another schematic diagram showing an exemplary method for recovering sulfate and chloride salts.

Some embodiments may include a pretreatment or preparation step prior to the recovery processes exemplified in FIGS. 1 and 2. One example of a process with pretreatment or preparation is shown in FIG. 3. FIG. 3 discloses pretreatment or preparation prior to entry into a system similar to those shown in FIGS. 1 and 2. Pretreatment and preparation may include, for example, preparing a brine from mixed salts, pretreating watewater via concentration or removal of other contaminants such as organics.

In some embodiments, pretreatment or preparation unit 24 may include a brine concentration unit. The brine concentration unit produces a concentrated brine by removing water as condensate. One example of an acceptable concentration unit is a flashing unit comprised of one or more stages. In such a flashing unit, wastewater being treated is flash cooled and further concentrated to levels appropriate for downstream salt recovery. This flash cooling also improves overall heat integration for the system. The condensate may be released, utilized in other processes for heat recovery, or further treated. Further treatment of the condensate may include condensate polishing. For example, ammonia may be in the condensate and may be removed via an ammonia stripper.

Pretreatment and preparation is not limited to one form of pretreatment or preparation. Some embodiments may include a chain of pretreatment or preparation steps. For example, in some embodiments, pretreatment unit may include a chain of devices for pH adjustment, membrane filtration (such as, for example, reverse osmosis membrane filtration), ion exchange, chemical treatment such as chemical softening and/or precipitation, or combinations thereof.

After pretreatment and/or preparation in the Pretreatment or Preparation Unit 24, the resultant feed may enter the treatment system via the hydrous salt crystallization (such as with the example shown in FIG. 1), the chloride salt crystallization unit (such as with the example shown in FIG. 2), or the sulfate salt crystallization unit.

The exemplary processes shown in FIGS. 1-3 may be incorporated into methods for treating wastewater produced in various processes. One type of wastewater that may be treated utilizing the process of FIGS. 1-3 is wastewater from coal to chemicals or coal to liquid processes. An example process of this type of treatment is shown in FIG. 4.

Figure 4:
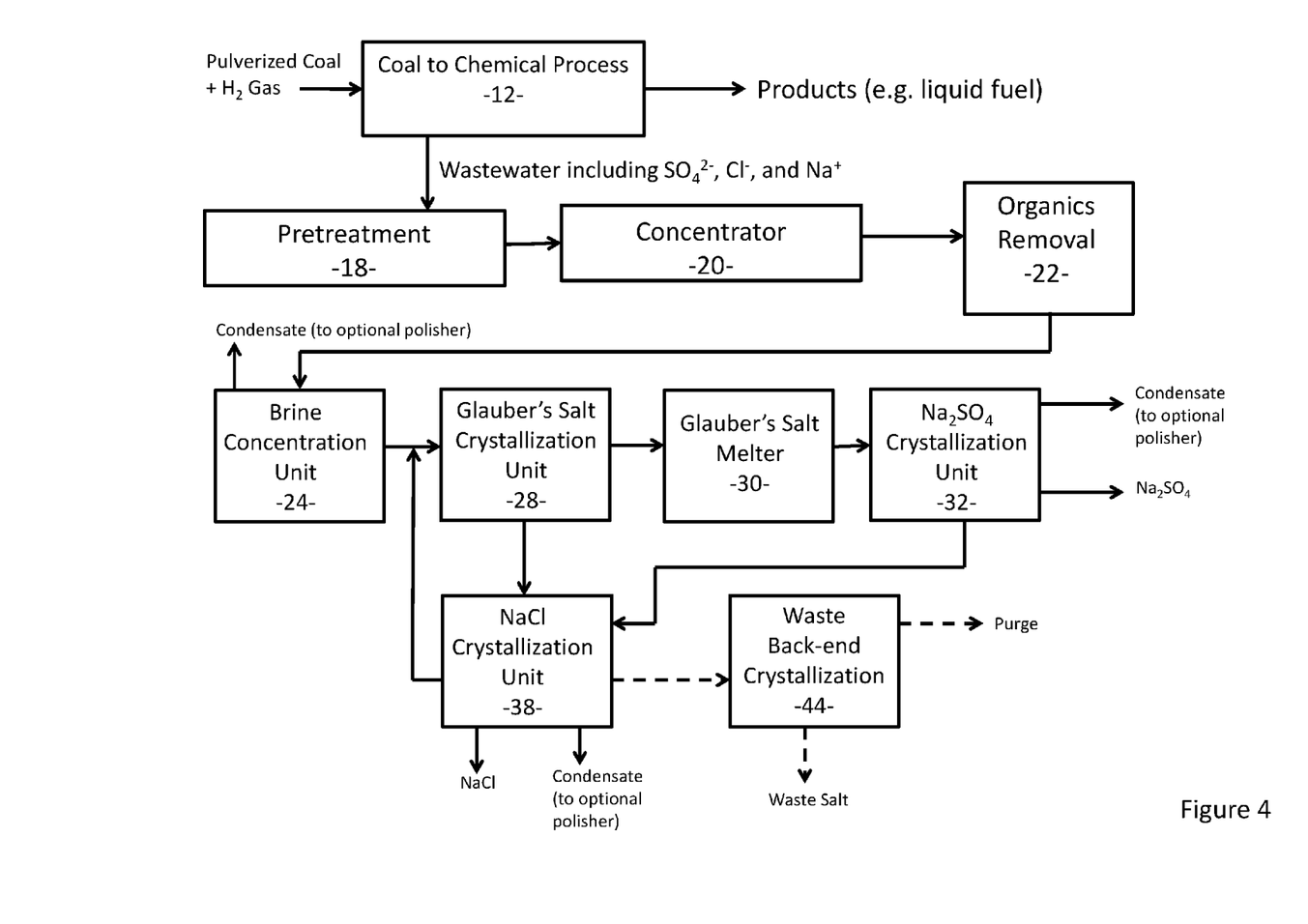
FIG. 4 is a schematic diagram showing an exemplary method for treating wastewater in the context of a coal to chemicals or coal to liquid process and recovering sodium sulfate and sodium chloride salts.

Turning to FIG. 4 of the drawings, a coal to chemical or coal to liquid process produces useful products, such as, for example, fuels or plastics. Typically, a coal to chemical or coal to liquid process gasifies coal to produce syngas. In one example, this gasification occurs when pulverized coal and hydrogen gas, as well as recycled coal-derived liquids are mixed with a catalyst to produce a crude gas. This may occur under pressurized gasification conditions. Crude gas may then be refined into synthetic gasoline, diesel, or other hydrocarbon products. In one refining process, the crude gas is contacted with water to cool the gas. The cooling allows a product to be obtained with a gas and liquid phase product. Oil may be separated from the liquid phase, leaving coal gasification wastewater. The wastewater may then be subjected to supercritical conditions and contacted with oxidants, such as organics and ammonia nitrogen, to obtain synthesis gas. After gasification, the products produced may be subjected to additional treatment. For example, in some indirect coal conversion methods, after gasification, the syngas is subjected to Fischer-Tropsch Synthesis, which produces products as well as steam and tail gas that may be used to generate electric power. Wastewater is produced in various places along a coal to chemical or coal to liquid process and contains alkali metals (typically sodium), sulfate, and chloride. During the gasification stage, wastewater is produced when water is used to convey slag and flyash from gasifier, to scrub particulates and chlorides from the syngas, and to process condensate from cooling the syngas. This wastewater typically contains chloride, ammonia, cyanides, and flyash. Wastewater is also produced in Fischer-Tropsch Synthesis, which typically contains oxygenated hydrocarbons and toxic metals. Additional processing of the Fischer-Tropsch Synthesis may produce additional wastewaters with organics, cyanides, ammonia, and phenol contaminants. Although these are examples of coal to chemical or coal to liquid processes, one of skill in the art appreciates that the methods described herein may be used to treat wastewater from any coal to chemical or coal to liquid process.

Wastewater generated from the conversion of coal to chemicals or fuel in some embodiments is directed to a pretreatment process or processes 18. The pretreatment process 18 removes various contaminants and may include one or more traditional pretreatment methods. For example, pretreatment may include pH adjustment, membrane filtration (such as, for example, reverse osmosis membrane filtration), ion exchange, chemical treatment such as chemical softening and/or precipitation, or combinations thereof. One of skill in the art appreciates that pretreatment is not used in some embodiments and, in embodiments where pretreatment is utilized, the type of pretreatment may vary due to the contaminants present in the water.

After the wastewater is pretreated, it is directed to a concentrator 20. Concentrator 20 removes water that may be further treated or released. The remaining contaminants, meanwhile, are concentrated. While various forms of concentrators may be used with these methods, in some embodiments, the concentrator 20 is an evaporator that yields blowdown that includes the concentrated wastewater with contaminants. In other embodiments, the concentrator 20 may be a reverse osmosis unit that yields a permeate and a reject stream that includes the concentrated water with contaminants. In some embodiments using reverse osmosis units, the permeate may be recycled back to the coal to chemical or coal to liquid process.

The composition of a typical wastewater exiting the concentrator 20 includes but is not limited to:

sodium ($Na^+$): 0.1-10%, and more often 5-10%
sulfate ($SO_4^{2-}$): 0.1-10%, and more often 7-10%
chloride ($Cl^-$): 0.1-6%, and more often 3-6%
Other constituents such as: silica, organics, potassium, nitrate, ammonia: 1-2%

Table 1 provides three exemplary wastewater concentrations that were treated with the method described herein. Example 1 corresponds to the concentrations found in a high sulfate brine produced in a Chinese coal to liquid plant. Example 2 corresponds to the concentrations found in a moderate sulfate brine from a Chinese coal to gas plant. Example 3 corresponds to a low sulfate brine obtained by dissolving salt out of an existing zero liquid discharge Chinese coal to chemical plant.

TABLE 1

Exemplary Wastewater Concentrations

|  | Example 1 | Example 2 | Example 3 |
| --- | --- | --- | --- |
| alkali metal (sodium) | 2.9% | 1.2% | 8.7% |
| sulfate | 5% | 0.7% | 1% |
| chloride | 0.8% | 1.3% | 13% |

In some embodiments, concentrated wastewater from the concentrator 20 is directed to an organics removal process 22. Various processes may be utilized to remove organics, such as, for example, filtration, adsorption, chemical treatment, and biological treatment. In one embodiment, the organics removal process 22 comprises treating the concentrated wastewater with activated carbon. One of skill in the art appreciates that organics removal is optional and its use depends on the contaminants found in the wastewater.

After removing organics, the wastewater may be treated pursuant to the methods shown in FIGS. 1-3. In particular, the wastewater is treated by a brine concentration unit 24 to remove additional water as condensate and produce a concentrated brine. Condensed brine from the brine concentration unit 24 is sent to a hydrous salt crystallization unit 28, where it is subjected to the hydrated salt crystallization process to produce hydrated salt crystals. In a preferred embodiment, hydrous salt crystallization unit 28 is a Glauber's salt crystallization unit, and sodium sulfate decahydrate ($Na_2SO_4 \cdot 10H_2O$) crystals are formed therein. Thereafter, the hydrated salt crystals produced from the hydrous salt crystallization unit 28 are separated from the mother liquor and the salt is directed to a melter 30. The hydrated salt is heated in the melter 30 to release the waters of hydration from the crystals and dissolve the crystals. The melted salt is directed to a sulfate crystallization unit 32 where anhydrous sulfate is crystallized. Mother liquor from the hydrous salt crystallization unit 28 and/or the purge from the sulfate crystallization unit 32 may be directed to and treated in the chloride salt crystallization unit 38 to form chloride salt crystals. The remaining purge in the chloride salt crystallizer may be directed back to the hydrous salt crystallization unit 28 for additional salt recovery or directed to a back-end crystallizer 44 to further treat and purge contaminants. The process produces, inter alia, salable quality sulfate and chloride salts, which may be offered for sale or utilized in other processes.

By treating the wastewater produced in the coal to chemicals process via the exemplary process shown in FIG. 4, as well as the methods described herein, the amounts of contaminants that are released to the environment are substantially reduced. Instead of wasting large amounts of water, the water is treated and released safely. Additionally, the methods disclosed herein provide beneficial pure salt products from the waste stream that may be sold or used in other processes. The methods optimize salt recovery and reduce the operating costs and waste volume.

Although the present methods and processes have been shown and described in considerable detail with respect to only a few/particular exemplary embodiments thereof, it should be understood by those skilled in the art that it is not intended to limit the methods or processes to the embodiments since various modifications, omissions, and additions may be made to the disclosed embodiments without materially departing from the novel teachings and advantages described herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for treating wastewater from a coal to chemical or coal to liquid process, comprising:
    converting coal to chemical or liquid and producing a wastewater;
    concentrating the wastewater to form a salt solution;
    directing the salt solution comprising an alkali metal, chloride, and sulfate to a hydrous salt crystallization unit and crystallizing hydrated sulfate salts to form hydrated sulfate salt crystals comprising sulfate and at least one alkali metal, and a hydrous salt crystallization unit solution;
    melting the hydrated sulfate salt crystals to form an aqueous sulfate solution;
    directing the aqueous sulfate solution to a sulfate crystallization unit and crystallizing anhydrous sulfate salts from the aqueous sulfate solution to form sulfate salt crystals comprising sulfate and at least one alkali metal, and a sulfate crystallization unit solution;
    directing at least a portion of the sulfate crystallization unit solution to the hydrous salt crystallization unit;
    directing at least a portion of the hydrous salt crystallization unit solution or at least a portion of the sulfate crystallization unit solution to a chloride salt crystallization unit and crystallizing chloride salt from the hydrous salt crystallization unit solution or the sulfate crystallization unit solution to form chloride salt crystals comprising chloride and at least one alkali metal, and a chloride salt crystallization unit solution; and
    directing at least a portion of the chloride salt crystallization unit solution to the hydrous salt crystallization unit.

2. The method of claim 1, further comprising removing organics from the wastewater.

3. The method of claim 2, further comprising: prior to removing organics from the wastewater, pre-concentrating the wastewater.

4. The method of claim 1, wherein concentrating the wastewater to form a salt solution comprises directing the wastewater to a reverse osmosis unit and producing a permeate and a salt solution.

5. The method of claim 1, wherein concentrating the wastewater to form a salt solution comprises directing the wastewater to an evaporator and producing a salt solution and a distillate.

6. The method of claim 1, further comprising pretreating the wastewater prior to concentrating the wastewater to form a salt solution.

7. The method of claim 6, wherein the pretreatment includes pH adjustment, membrane filtration, ion exchange, chemical treatment, or combinations thereof.

8. A method for treating wastewater from a coal to chemical or coal to liquid process, comprising:
- converting coal to chemical or liquid and producing a wastewater;
- pretreating the wastewater to remove at least some contaminants;
- pre-concentrating the wastewater to form a concentrated wastewater;
- removing organics from the concentrated wastewater;
- concentrating the concentrated wastewater to form a salt solution;
- directing the salt solution comprising an alkali metal, chloride, and sulfate to a hydrous salt crystallization unit and crystallizing hydrated sulfate salts to form hydrated sulfate salt crystals comprising sulfate and at least one alkali metal, and a hydrous salt crystallization unit solution;
- melting the hydrated sulfate salt crystals to form an aqueous sulfate solution;
- directing the aqueous sulfate solution to a sulfate crystallization unit and crystallizing anhydrous sulfate salts from the aqueous sulfate solution to form sulfate salt crystals comprising sulfate and at least one alkali metal, and a sulfate crystallization unit solution;
- directing at least a portion of the sulfate crystallization unit solution to the hydrous salt crystallization unit;
- directing at least a portion of the hydrous salt crystallization unit solution or at least a portion of the sulfate crystallization unit solution to a chloride salt crystallization unit and crystallizing chloride salt from the hydrous salt crystallization unit solution or the sulfate crystallization unit solution to form chloride salt crystals comprising chloride and at least one alkali metal, and a chloride salt crystallization unit solution; and
- directing at least a portion of the chloride salt crystallization unit solution to the hydrous salt crystallization unit.

9. A method of recovering sulfate and chloride salts from a salt solution, comprising:
- directing the salt solution comprising an alkali metal, chloride, and sulfate to a hydrous salt crystallization unit and crystallizing hydrated sulfate salts to form hydrated sulfate salt crystals comprising sulfate and at least one alkali metal, and a hydrous salt crystallization unit solution;
- melting the hydrated sulfate salt crystals to form an aqueous sulfate solution;
- directing the aqueous sulfate solution to a sulfate crystallization unit and crystallizing anhydrous sulfate salts from the aqueous sulfate solution to form sulfate salt crystals comprising sulfate and at least one alkali metal, and a sulfate crystallization unit solution;
- directing at least a portion of the sulfate crystallization unit solution to the hydrous salt crystallization unit;
- directing at least a portion of the hydrous salt crystallization unit solution or at least a portion of the sulfate crystallization unit solution to a chloride salt crystallization unit and crystallizing chloride salt from the hydrous salt crystallization unit solution or the sulfate crystallization unit solution to form chloride salt crystals comprising chloride and at least one alkali metal, and a chloride salt crystallization unit solution; and
- directing at least a portion of the chloride salt crystallization unit solution to the hydrous salt crystallization unit.

10. The method of claim 9, wherein the alkali metal is sodium.

11. The method of claim 9, wherein the alkali metal is lithium.

12. The method of claim 9, further comprising purifying the chloride salt crystals.

13. The method of claim 9, wherein purifying the chloride salt crystals comprises:
- directing the chloride salt crystals to a recrystallization unit;
- melting the chloride salt crystals; and
- recrystallizing chloride salt crystals.

14. The method of claim 9, further comprising,
- directing at least a portion of the chloride salt crystallization unit solution to a waste crystallization unit; and
- crystallizing waste salt to form waste salt and a purge.

15. The method of claim 9, wherein crystallizing anhydrous sulfate salt in the sulfate salt crystallization unit further comprises producing a condensate.

16. The method of claim 15, further comprising polishing the condensate.

17. The method of claim 9, wherein the salt solution is a brine.

18. The method of claim 17, wherein the brine is produced from a water pretreatment process.

19. The method of claim 18, wherein the water pretreatment process includes treating the water in a crystallizer or an evaporator.

20. The method of claim 17, wherein the brine is prepared in a brine preparation unit.

21. The method of claim 18, wherein the water pretreatment process includes removing at least some organics from the water.

22. The method of claim 1, further comprising:
- determining the concentration of sulfate and chloride in the salt stream; and
- directing the salt stream to a crystallization unit based on the concentrations of sulfate and chloride, wherein:
  - if the ratio of chloride to sulfate is greater than 12, first directing the salt stream to the chloride salt crystallization unit;
  - if the ratio of chloride to sulfate is less than 5, first directing the salt stream to the hydrous salt crystallization unit; and
  - if the ratio of chloride to sulfate is between 5 and 12, first directing the salt stream to either the hydrous salt crystallization unit or the chloride salt crystallization unit.

23. The method of claim 9, further comprising:
- determining the concentration of sulfate and chloride in the salt stream; and
- directing the salt stream to a crystallization unit based on the concentrations of sulfate and chloride, wherein:
  - if the ratio of chloride to sulfate is greater than 12, first directing the salt stream to the chloride salt crystallization unit;
  - if the ratio of chloride to sulfate is less than 5, first directing the salt stream to the hydrous salt crystallization unit; and if the ratio of chloride to sulfate is between 5 and 12, first directing the salt stream to either the hydrous salt crystallization unit or the chloride salt crystallization unit.

24. A method of recovering sulfate and chloride salts from a salt solution, comprising:

directing a solution comprising sodium, chloride, and sulfate to a Glauber's salt crystallizer and crystallizing $Na_2SO_4 \cdot 10H_2O$ to form $Na_2SO_4 \cdot 10H_2O$ crystals and a Glauber's salt crystallizer solution;

melting the $Na_2SO_4 \cdot 10H_2O$ crystals to form an aqueous sodium sulfate solution;

directing the aqueous sodium sulfate solution to a $Na_2SO_4$ crystallizer and crystallizing sodium sulfate from the aqueous sodium sulfate solution to form $Na_2SO_4$ crystals and a $Na_2SO_4$ crystallizer solution;

recycling at least a portion of the $Na_2SO_4$ crystallizer solution to the Glauber's salt crystallizer;

directing at least a portion of the Glauber's salt crystallizer solution or at least a portion of the $Na_2SO_4$ crystallizer solution to a NaCl crystallizer and crystallizing NaCl from the Glauber's salt crystallizer solution or the $Na_2SO_4$ crystallizer solution to form NaCl crystals and a NaCl crystallizer solution; and recycling at least a portion of the NaCl crystallizer solution to the Glauber's salt crystallizer.

* * * * *